(12) United States Patent
Meyer et al.

(10) Patent No.: US 10,798,887 B2
(45) Date of Patent: Oct. 13, 2020

(54) METHOD AND SYSTEM FOR TREATING IRRIGATION WATER

(71) Applicants: Mark Meyer, Fox Point, WI (US); George Rihovsky, San Clemente, CA (US)

(72) Inventors: Mark Meyer, Fox Point, WI (US); George Rihovsky, San Clemente, CA (US)

(73) Assignee: FLOW-TECH SYSTEMS, LLC, Las Vegas, NV (US)

( * ) Notice: Subject to any disclaimer, the term of this patent is extended or adjusted under 35 U.S.C. 154(b) by 0 days.

(21) Appl. No.: 16/229,909

(22) Filed: Dec. 21, 2018

(65) Prior Publication Data

US 2020/0128765 A1 Apr. 30, 2020

Related U.S. Application Data

(60) Provisional application No. 62/749,849, filed on Oct. 24, 2018.

(51) Int. Cl.
*A01G 25/00* (2006.01)
*A01G 25/09* (2006.01)
(Continued)

(52) U.S. Cl.
CPC ............... *A01G 25/00* (2013.01); *A01G 7/04* (2013.01); *A01G 25/02* (2013.01); *A01G 25/092* (2013.01);
(Continued)

(58) Field of Classification Search
CPC ...... A01G 25/00; A01G 25/02; A01G 25/092; A01G 25/09; A01G 25/16; A01G 25/162;
(Continued)

(56) References Cited

U.S. PATENT DOCUMENTS 5,514,283 A * 5/1996 Stefanini .................. B01J 19/12
210/143
6,267,933 B1 7/2001 Thomason
(Continued)

FOREIGN PATENT DOCUMENTS

CN 206219313 U 6/2017
WO 2018111604 A1 6/2018

OTHER PUBLICATIONS

Surendran et al., The impacts of magnetic treatment of irrigation water on plant, water and soil characteristics, Sep. 11, 2016, Elsevier, Agricultural Water Management, 178, pp. 21-29. (Year: 2016).*
(Continued)

*Primary Examiner* — David C Mellon
(74) *Attorney, Agent, or Firm* — McAndrews, Held & Malloy, Ltd.

(57) ABSTRACT

Embodiments of the present invention are directed to methods and systems for treating irrigation water by introducing a propagating electromagnetic field into the irrigation water as it flows through an irrigation system. The treatments described herein may have a variety of beneficial effects on the water, including a significant increase in the percentage of the water that is maintained in the root zone of a given crop as plant-available water and the essential mineral, e.g. calcium and/or magnesium, uptake of that crop.

24 Claims, 14 Drawing Sheets

(51) Int. Cl.
*A01G 25/02* (2006.01)
*C02F 1/48* (2006.01)
*A01G 7/04* (2006.01)

(52) U.S. Cl.
CPC ........ *C02F 1/487* (2013.01); *C02F 2201/486* (2013.01)

(58) Field of Classification Search
CPC ...... A01G 25/165; A01G 25/167; A01G 7/04; C02F 2303/14; C02F 2303/20; C02F 2303/22; C02F 1/48; C02F 1/484; C02F 1/485; C02F 1/487; C02F 2201/486; B01J 19/08; B01J 19/087; B01J 19/12; B01J 19/129; B03C 1/00; B03C 1/02; B03C 1/031; B03C 1/033; B03C 1/0335; B03C 1/0337; B03C 1/034; B03C 1/035; B03C 1/0355; B03C 1/23; B03C 1/28; B03C 1/286; B03C 1/288; B03C 1/32

USPC .......................................... 210/222, 223, 695
See application file for complete search history.

(56) References Cited

U.S. PATENT DOCUMENTS

| | | | |
|---|---|---|---|
| 2010/0101958 A1* | 4/2010 | Holland | B03C 5/02 204/557 |
| 2012/0217815 A1* | 8/2012 | Clark | C02F 1/487 307/104 |
| 2014/0262788 A1* | 9/2014 | Fearon | C02F 1/48 204/554 |
| 2016/0207801 A1* | 7/2016 | Stronczek | C02F 1/487 |

OTHER PUBLICATIONS

International Search Report and Written Opinion for PCT/US19/57837, dated Jan. 20, 2020, 10 pages.

\* cited by examiner

METHOD AND SYSTEM FOR TREATING IRRIGATION WATER

This application claims priority to U.S. Provisional Patent Application No. 62/749,849, filed Oct. 24, 2018, the entirety of which is incorporated by reference herein.

SUMMARY OF THE INVENTION

Embodiments of the present disclosure are directed to methods for reducing the amount of water used to irrigate a field by introducing an electromagnetic signal into the irrigation water as it flows through a conduit. The electromagnetic signal is introduced in a manner that produces propagation of an electromagnetic field through the irrigation water as the water flows to the emitters by which it is introduced to the field. By irrigating a field, which contains both soil and a crop growing from that soil, with the treated water, it has presently been found that the water content of the soil within a root zone of the crop may be significantly increased relative to a field that is conventionally irrigated.

In some embodiments, for example, treatment of the irrigation water as described herein may provide at least a 5% reduction, at least a 10% reduction, or even at least a 20% reduction in the amount of water needed and used to irrigate a field. The causes of the water reduction may vary depending on the type of soil being irrigated. For instance, in embodiments where the soil is a clay soil, the treated water has been found to have an increased degree and rate of absorption into the soil. In embodiments where the soil is a sandy soil, the treated water has been found to have a decreased degree and rate of percolation through the root zone of a crop growing from the soil. And in embodiments where the soil is a water-repellant soil, the treated water has been found to infiltrate the soil at an increased rate. The common result of all of these effects is an increase in the amount of water that enters and is maintained within the root zone of the crop, i.e. plant-available water.

Embodiments of the present disclosure are also directed to methods for increasing the essential mineral, e.g. calcium and/or magnesium, content of a crop by introducing an electromagnetic signal into the irrigation water as it flows through a conduit. The electromagnetic signal is introduced in a manner that produces propagation of an electromagnetic field through the irrigation water as the water flows to the emitters by which it is introduced to the field. By irrigating a field, which contains both soil and a crop growing from that soil, with the treated water, it has presently been found that the crop may be provided with an increased calcium content relative to a crop that is conventionally irrigated. In some embodiments, for instance, treatment of the irrigation water as described herein may provide at least a 5%, at least a 10%, or at least a 15% increase in the calcium content of the crops.

Embodiments of the present disclosure are also directed to methods for reducing the amount of (including eliminating altogether) chemical surfactants introduced into irrigated soil by introducing an electromagnetic signal into the irrigation water as it flows through a conduit. The electromagnetic signal is introduced in a manner that produces propagation of an electromagnetic field through the irrigation water as the water flows to the emitters by which it is introduced to the field. By irrigating a field, which contains both soil and a crop growing from that soil, with the treated water, it has presently been found that the treatment of the irrigation water in this manner causes a reduction in the surface tension of the water and alters the interaction of the water with the soil, thereby reducing or eliminating the need for chemical surfactants.

Embodiments of the present disclosure are also directed to methods for reducing the amount of fertilizer introduced into irrigated soil by introducing an electromagnetic signal into the irrigation water as it flows through a conduit. The electromagnetic signal is introduced in a manner that produces propagation of an electromagnetic field through the irrigation water as the water flows to the emitters by which it is introduced to the field. By irrigating a field, which contains both soil and a crop growing from that soil, with the treated water, it has presently been found that the treatment of the irrigation water in this manner causes a reduction in the amount of nutrients that are leached from the soil, thereby reducing the need for fertilizers.

Other embodiments of the present disclosure are directed to an irrigation system treated according to any of the methods described herein. The irrigation system may be any type of system that is known in the art, including for example a drip irrigation system, a sprinkler irrigation system, a center pivot irrigation system, a lateral move irrigation system, or a combination thereof. The irrigation system generally includes an arrangement of conduits that distribute irrigation water through one or more fields in which crops are grown and a treatment device operatively connected to a conduit within that arrangement. The treatment device is configured to introduce an electromagnetic signal into water flowing through the conduit, such that an electromagnetic field propagates through the water within the arrangement of conduits.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
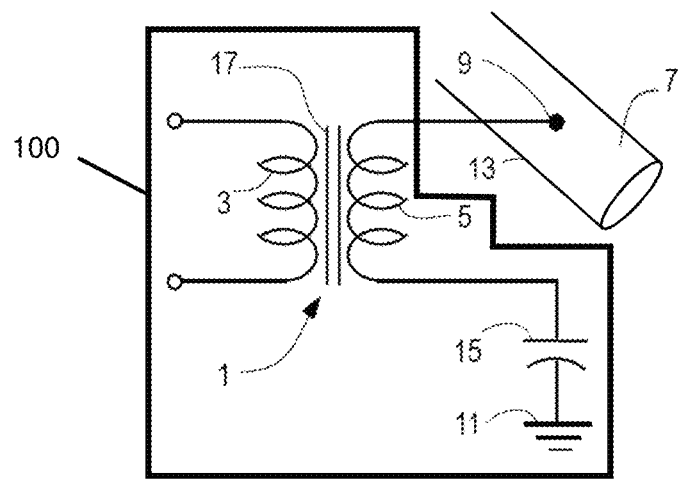
FIG. 1 is an electronic circuit diagram of an embodiment of a treatment system operably connected to a fluid-containing conduit.

Embodiments of the present disclosure are directed to methods and systems for treating irrigation water with a propagating electromagnetic field. By treating irrigation water in this manner, embodiments of the present invention produce a number of desirable effects, including increasing plant-available water; improving water absorption and distribution within soil; managing percolation/drainage and reducing leaching of nutrients from the soil; reducing grower inputs such as water, power, and additives; and increasing essential mineral, e.g. calcium and/or magnesium, uptake by crops. Additional benefits include improving the water's molecular angle of contact, thereby increasing its capillary force; increasing crop yield; improving water infiltration into the soil; increasing wetting within the root zone of a crop; reducing leaching in water-resistant or water-repellant soil; accelerating seed germination; reducing the amount and volume of fertilizers used in growing a given crop; improving the root structure of a crop; providing a crop with higher resistance to disease; and improving crop health and vitality.

For instance, treatment of irrigation water with a propagating electromagnetic field may increase the amount of plant available water by causing the treated water to hold higher in the soil profile. Treatment may cause the water to be absorbed by the soil, spreading horizontally within the soil, as opposed to percolating deeper (vertically) into the soil. As a result, the region of the soil profile having the greatest importance for plant growth, e.g. the root zone, retains moisture significantly better than soil irrigated with untreated water. Treatment of irrigation water according to embodiments of the present disclosure may thus provide a significant reduction both in the amount of irrigation water used and the energy required to supply that water. It may also allow farmers to irrigate less frequently and/or with shorter run times than would otherwise be needed for a particular crop.

By providing and holding the treated water within the effective root zone of the crops being grown, embodiments of the present disclosure may also increase the amount of plant-available water (PAW).

In general, an increase in plant-available water may be demonstrated by an increase in the volumetric water content of the soil within a root zone of the crop being grown from that soil. For instance, a control plot may be irrigated with conventional, i.e. non-treated water and a test plot may be irrigated with water that has been treated by introduction of a propagating electromagnetic field, as described herein. The control plot and the test plot should be used to grow the same crop and should generally be irrigated by an identical or substantially identical irrigation system (and according to an identical irrigation schedule). Ideally, the control plot and the test plot may also be closely situated to one another. Soil moisture sensors may be placed into the soil at substantially identical locations within each plot and may be used to measure the moisture levels, e.g. the volumetric water content, of the soil. The time period over which this water content of the test and control plots may be measured may vary. Generally, a significant difference in the volumetric water contents of the two soils will be measurable within a number of days. For example, in some embodiments, the water contents may be compared after 1 day, alternatively after 2 days, alternatively after 3 days, alternatively after 4 days, alternatively after 5 days, alternatively after 6 days, alternatively after 7 days.

In some embodiments, treatment of irrigation water in accordance with the present invention may be used to produce at least a 10% increase in plant available water within the root zone of a crop (using the same amount of irrigation water), alternatively at least a 15% increase in plant available water within the root zone, alternatively at least a 20% increase in plant available water within the root zone, alternatively at least a 25% increase in plant available water within the root zone, alternatively at least a 30% increase in plant available water within the root zone. The degree of the increase may depend on a number of factors, including primarily the properties of the soil.

In general, the root zones for most crops are the top 36 inches (3 feet) of soil, and more typically the top 24 inches (2 feet) of soil. Typically, therefore, increases in plant-available water may be measured in the top 36 inches of soil, alternatively in the top 24 inches of soil. In some examples, however, increases in plant-available water may be measured in the top 20 inches of soil or in the top 18 inches of soil, depending on the specific crop. The measuring of soil moisture within an identified root zone may easily be performed using a multi-sensor soil probe (e.g. a six-sensor soil probe, a nine-sensor soil probe, etc.), which positions sensors at a number of depths within the root zone that are separated by preconfigured intervals.

Alternatively, an increase in plant-available water may be demonstrated by the ability to obtain a particular soil moisture level while using a lesser volume of irrigation water. For instance, in some embodiments, one may be able to achieve substantially the same volumetric water content in a treated soil (i.e. a soil irrigated with treated water) as in a control soil (irrigated with untreated water), but using at least 5% less irrigation water by volume, alternatively at least 10% irrigation water by volume, alternatively at least 15% irrigation water by volume, alternatively at least 20% irrigation water by volume, alternatively at least 25% irrigation water by volume, alternatively at least 30% irrigation water by volume, alternatively at least 33% irrigation water by volume, alternatively at least 40% irrigation water by volume, alternatively at least 45% irrigation water by volume, alternatively at least 50% irrigation water by volume.

Accordingly, embodiments of the methods and systems described herein may be used to reduce the amount (e.g. volume) of irrigation water that is pumped through a given irrigation system by at least 5%, alternatively at least 10%, alternatively at least 15%, alternatively at least 20%, alternatively at least 25%, alternatively at least 30%, alternatively at least 33%, alternatively at least 40%, alternatively at least 45%, alternatively at least 50%. Relatedly, embodiments of the methods and systems described herein may be used to alter the irrigation schedule, e.g. to increase the intervals between irrigation cycles and/or to decrease the run time of each irrigation cycle.

Although increases in plant-available water are described above with reference to field testing, an increase in plant-available water may also be identified by laboratory testing that uses the soil from a given field (or a soil of the same classification) and which is configured to mimic the conditions within that field, e.g. irrigation method, type of crop being grown, etc. Moreover, increases in plant-available water may also be measured in a variety of ways that reflect the different effects the treated water has in different soils, e.g. water repellant vs. non-water repellant soil, sandy (loose) vs. clay-like (tight) soil, etc. Non-limiting examples of these methods are shown in the Examples, in which laboratory and field testing was performed to demonstrate the beneficial effects achieved in various soil types.

For instance, when a propagating electromagnetic field is applied to water used to irrigate water-repellant soils, it has been found that the treated water significantly enhances the wetting of the soil. As a result, the water stays within the root zone, and a grower may use less water (and less power to pump the lower volume of water) and less fertilizer. When a propagating electromagnetic field is applied to water used to irrigate non-water-repellant soils, the treated water spreads throughout the soil (both vertically and laterally) more quickly and effectively. This too increases the volume of water within the root zone, leading to the more efficient usage of the irrigation water.

Moreover, when a propagating electromagnetic field is used to treat irrigation water, that water may (1) absorb more effectively in clay, e.g. tight, soil in which the absorption of conventional water may be slow and/or (2) resist percolation (drainage) in sandy, e.g. loose, soils in which drainage of conventional water through the soil may be quick. In each instance, therefore, the treated water is better maintained within and distributed throughout the root zone, leading to a higher percentage of plant available water and a lower percentage of water that is lost to pooling, evapotranspiration, percolation out of the root zone, etc.

Further, use of a propagating electromagnetic field to treat irrigation water may enhance the ability of the treated water to infiltrate the surface layer of water-repellant and/or tight (e.g. clay) soils, which reduces pooling of water on the surface and the resulting evapotranspiration.

Use of a propagating electromagnetic field to treat irrigation water, as described herein, may also bring about a significant reduction in soil nutrient and mineral loss associated with leaching. Accordingly, treatment of irrigation water in accordance with the present disclosure may lead to an uptake of nutrients and minerals by plants grown from the treated soil (i.e., the soil that is irrigated with treated water). Accordingly, embodiments of the present disclosure may also provide for a significant reduction in the amount of chemicals, e.g. surfactants, fertilizers, pesticides, herbicides, and/or combinations thereof, that are used to grow various crops.

Treatment of irrigation water with a propagating electromagnetic field may also bring about an increase in a plant's essential mineral, e.g. calcium and/or magnesium, uptake, such as may be identified by an increase in the crop's calcium levels. An increase in essential mineral uptake improves the health of the plants that are irrigated with the treated water, including by improving the plants' root structure, improving resistance of the plants to disease, and improving the shelf life of fruits and vegetables. It also allows a grower to reduce the amount of mineral supplements and/or fertilizers introduced into the soil.

Further, treatment of irrigation water with a propagating electromagnetic field may also reduce the surface tension of the water. For example, when water (at 20° C.) was treated in accordance with embodiments of the present disclosure, it was found that the surface tension of the water was reduced from about 73 dynes/cm to about 66 dynes/cm. While the exact surface tension of irrigation water is likely to vary from those values at different temperatures, treatment as described herein brings about a similar reduction in surface tension for irrigation water at any temperature. In other words, treatment of irrigation water with a propagating electromagnetic field as described herein may operate as a surfactant. Accordingly, treatment of irrigation water in accordance with embodiments of the present disclosure may allow farmers to reduce the amount of chemical surfactants added to irrigation water or even eliminate (i.e. reduce to zero) the use of such chemical surfactants altogether. Because chemical surfactants contained within irrigation water are known to deplete the soil of nutrients, this may lead to higher-quality soil (and thus higher-quality crops) as well as less chemical byproduct being introduced into the environment.

Treatment Devices

According to embodiments of the present disclosure, a pulsed electromagnetic, e.g. radio frequency (RF), signal is injected to an irrigation system in a manner that provides for propagation of an electromagnetic field throughout the irrigation water flowing through (or held within) the irrigation system. Therefore, embodiments of the treatment device provide a physical treatment of the irrigation water without introducing any chemicals or other foreign substances into the irrigation system. Embodiments of the treatment devices described herein also operate on little energy and requires little to no on-going maintenance.

In order to obtain a propagation of the electromagnetic field throughout the system, the signal preferably has the characteristics of an oscillating, exponentially decaying waveform. The frequency of the signal can be selected to achieve a desired propagation for a particular fluid-containing system. For example, the frequency of the signal may be selected to be between about 60 kHz and about 400 kHz, alternatively between about 80 kHz and about 380 kHz, alternatively between about 80 kHz and about 330 kHz, alternatively between about 80 kHz and about 300 kHz, alternatively between about 100 kHz and about 300 kHz.

The signal may be created in bursts, or pulses, which may be repeated at variable, pseudo-random intervals. In some embodiments, each pulse may have a frequency between 5 kHz and 40 kHz, alternatively between 5 kHz and 20 kHz.

In some embodiments, therefore, the pulses may be repeated up to 40,000 times per second, for instance between 5,000 and 20,000 times per second.

The electromagnetic signal may be generated and introduced into the irrigation system in a variety of ways, some of which are described below with reference to FIGS. 1 through 4.

An embodiment of a treatment device 100 configured to generate an electromagnetic signal and introduce that signal into a conduit of an irrigation system in a manner that provides for conductive propagation of the signal throughout the irrigation water is illustrated in FIG. 1. In this embodiment, a pulsed radio frequency signal is introduced in the primary coils 3 of a transformer 1. The transformer 1 transfers the signal to the secondary coils 5. The signal is then injected into a fluid-containing system 7 by a connection between a conduit of that system 13 and a load terminal 9, which in this instance is the first terminal of a secondary coil of the transformer. In order to provide a low impedance to balance the load presented by the fluid-containing system 7, a second terminal of the secondary coil 11 is operably connected to ground. Accordingly, this terminal 11 may be referred to as a ground terminal.

In some embodiments, the transformer 1 may be a toroidal transformer having a core 17 that comprises a ferrite ring. This type of transformer 1 operates particularly well at high frequencies. In some embodiments, at least the secondary coil 5 of the toroidal transformer 1 may be formed by wrapping a number of turns of electrical wire around the ferrite ring core 17. By using wire as the secondary coil 5 of the transformer, the signal generator 100 may be operably connected to a fluid-containing system 7 with ease. Where the secondary coil 5 is formed in this way, the load terminal 9 and the ground terminal 11 are preferably located at opposite ends of the wire that forms the secondary coil 5. Alternatively, a standard transformer unit may be used. In that case, a load terminal 9 may be connected, via electrical wire, to one tap of the secondary coil 5 and a ground terminal 11 may be connected, via electrical wire, to another tap of the secondary coil. The number of turns of secondary coil 5 between the two taps may be selected to achieve a signal having desired properties.

The transformer may have a varying number of turns of primary coil 3 and secondary coil 5. Generally, few turns of both primary coil and secondary coil are needed. By selecting a particular ratio of turns, one may either increase or decrease the voltage that is used in treating the fluid-containing system 7.

In some embodiments, a load terminal 9 of the secondary coil 5 is connected to a pipe or other conduit 13 through which a fluid flows. In some embodiments, the conduit 13 is made of conductive material, in which case a load terminal 9 may be operably connected to the fluid-containing system 7 by contact between the terminal and the conduit. In other embodiments, however, the conduit 13 may be made of a non-conductive material. Where the conduit 13 is non-conductive, a load terminal 9 may be operatively connected to the fluid-containing system 7 in a number of ways. For example, a conductive material may be inserted to a section of the conduit 13 and a load terminal 9 brought into contact with the conductive insert. Alternatively, a conductive material may be clamped around a section of the conduit 13 and a load terminal 9 brought into contact with the conductive material, allowing injection of the signal by capacitance. Alternatively, a portion of the non-conductive conduit 13 can be replaced with an equivalently sized section of conduit that comprises a conductive material.

The ground terminal 11 is operably connected to ground to form a current return path from one side of the secondary coil 5 to the other. The load terminal 9 is operably connected to the irrigation system 200, which is, itself, coupled to ground. So as not to provide a specific point for the return path and thereby reduce the potential propagation of the signal, the ground terminal 11 may operably be connected to ground through a capacitor 15.

Although injection of the signal by capacitance may be insufficient to produce the same benefits and/or degree of benefits described herein, injection of the electromagnetic signal by capacitance is also contemplated and may be performed using different connection mechanisms and/or different treatment devices from the embodiments disclosed herein, as would be understood by those of skill in the art.

Figure 2:
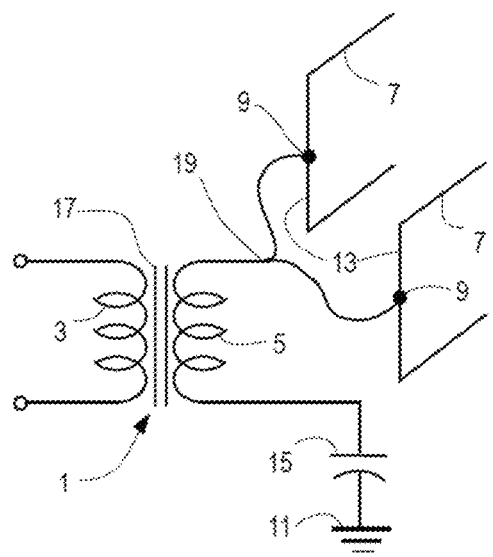
FIG. 2 is an electronic circuit diagram of an embodiment of a treatment system operably connected to a number of fluid-containing conduits.

In some embodiments, a single treatment device 100 may be used to introduce an electromagnetic signal into multiple irrigation systems or multiple lines of an irrigation system. An example of such an embodiment is illustrated in FIG. 2. As shown in FIG. 2, the electrical wire at one end 19 of a secondary coil 5 of a transformer may be split to provide multiple load terminals 9. Each load terminal 9 may be operably connected to an independent fluid-containing system 7 to provide the desired treatment.

The radio frequency signal may be generated and introduced in the primary coils of a transformer in a number of ways. In some embodiments, a microcontroller having a digital to analogue converter may directly synthesize the signal as a pulsed waveform having the desired characteristics. The signal is then amplified, if necessary, and fed to the primary coil of the transformer. The signal may be injected into the fluid-containing system as described above.

Figure 3:
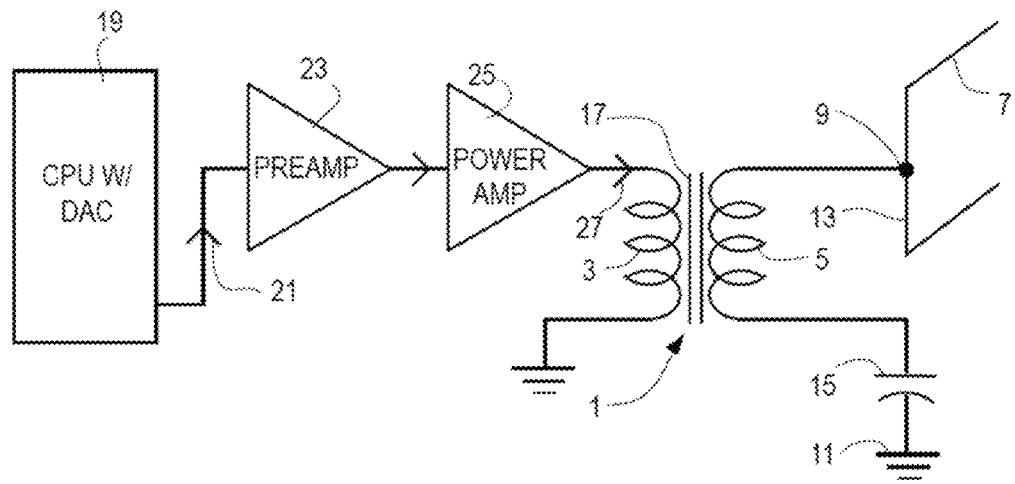
FIG. 3 is an electronic circuit diagram of an embodiment of a treatment system for generating and injecting a pulsed radio frequency signal into a fluid-containing system.

An example of such an embodiment is illustrated in FIG. 3. As shown in FIG. 3, a microcontroller equipped with a digital to analogue converter (DAC) 19 generates, at three volts, a signal 21, which comprises an oscillating waveform having a desired frequency and which may be pulsed pseudo-randomly. The signal 21 is then shifted and amplified up to twelve volts by a preamplifier 23 and fed to a power amplifier 25, which raises the current of signal so that it can drive a high-frequency transformer 1. The resulting signal 27 may be introduced to the primary coils 3 of the high-frequency transformer 1. The signal may be injected into the fluid-containing system 7 as described above.

In another embodiment, a microcontroller produces short high-current pulses. The short high-current pulses are then shifted and amplified, if necessary, before being switched into a series resonant LC circuit. The LC circuit comprises a high-voltage capacitor and the primary coils of a transformer, which act as the inductor. When charged by the pulse, the LC circuit generates an oscillating waveform having a particular frequency. By selecting the values of inductance (L) and capacitance (C), a user may preselect a frequency that is optimized for treatment of the particular irrigation system. The signal may be injected into the fluid-containing system as described above.

Figure 4:
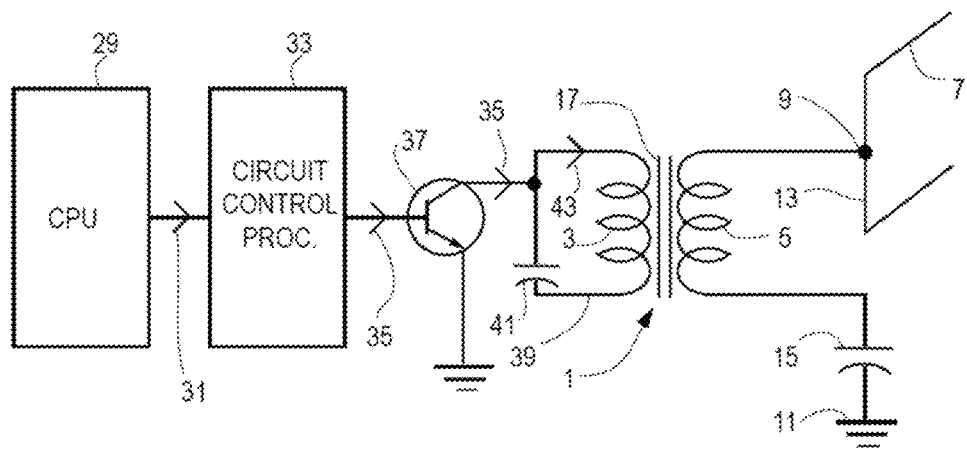
FIG. 4 is an electronic circuit diagram of an embodiment of a treatment system for generating and injecting a pulsed radio frequency signal into a fluid-containing system.

An example of such an embodiment is illustrated in FIG. 4. As shown in FIG. 4, a microcontroller 29 generates, at three volts, short high-current pulses 31 at a frequency that ranges pseudo-randomly between 5 and 20 KHz. The pulses 31 are then shifted up to twelve volts and the current is amplified by a circuit control processor 33. The amplified pulses 35 are fed to the base of a bipolar transistor 37, where they are switched into a series resonant LC circuit 39, comprising a capacitor 41 and the primary coils 3 of a high-frequency transformer 1. The values of inductance (L) and capacitance (C) are selected to produce an oscillating waveform having a frequency within a preselected range, e.g. between 100 and 300 kHz. Accordingly, a signal 43, which comprises an oscillating waveform with a frequency within the preselected range and that is pulsed pseudo-randomly, may be introduced in the primary coils 3 of a transformer 1. The signal may thus be injected into the fluid-containing system 7 as described above.

Irrigation Systems and Methods for Treating

Figure 5:
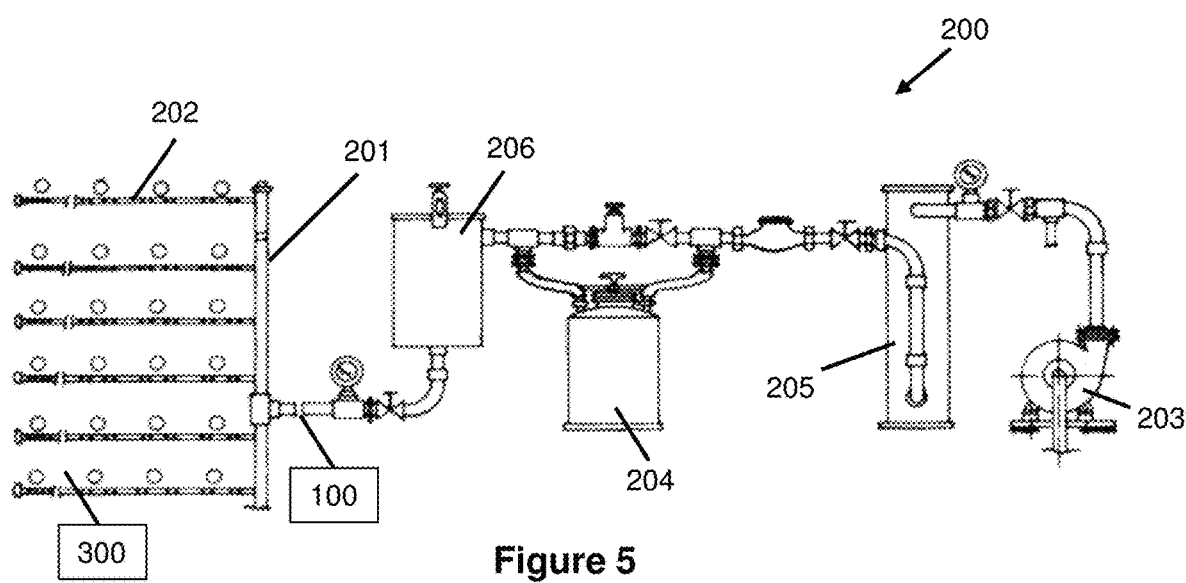
FIG. 5 is a diagram of an embodiment of a drip irrigation system comprising a treatment system in accordance with the present disclosure.

Embodiments of the present invention are directed to irrigation systems comprising a treatment device 100 for generating and introducing an electromagnetic signal into the irrigation system 200 in a manner that provides for conductive propagation of an electromagnetic field throughout the irrigation water. An example of an irrigation system 200, in this instance a drip irrigation system, comprising a treatment device 100 is shown in FIG. 5. The irrigation system 200 may be any known irrigation system, as the treatment devices 100 described herein may easily be configured to operate with any existing irrigation system. In some embodiments, for instance, the irrigation system 200 may be a drip irrigation system, a sprinkler irrigation system, a center pivot irrigation system, a lateral move irrigation system, combinations thereof, or the like.

The treatment devices 100 described herein may be installed on an irrigation system 200 in substantially any location along the conduit that makes up the water flow path, e.g. on the piping. Typically, the treatment device 100 may be installed on or before a main line 201, such that the propagating electromagnetic field is introduced into the irrigation water prior to distribution of that water into a plurality of lateral lines 202, to a plurality of center pivots, etc. For instance, as shown in FIG. 5, the treatment device 100 may be installed on a common header. In most instances, the treatment device 100 may be installed on a conduit through which the entire volume of irrigation water flows, e.g. after the pump(s) 203 and prior to distribution of the irrigation water throughout the multiple lines that run to and/or through each field. However, in some instances, such as where the water is distributed over unusually large distances or the volume of water being used is unusually high, treatment devices 100 may be installed on multiple lines, e.g. on one or more lateral lines 202.

The treatment device 100 may be installed on an irrigation system 200 in a number of ways. In many embodiments, for instance, the conduit may be provided with a conductive material at the point at which the treatment device 100 is attached the conduit. In this way, the electromagnetic signal is provided with an initial conductive pathway into the irrigation water. However, because the water itself acts to conduct the signal throughout the irrigation piping system, the remainder of the piping may be non-conductive. This is of particular importance because the piping in many irrigation systems 200 is made of non-conductive plastic materials. Accordingly, an existing conductive (e.g. metal) component of an irrigation system 200 may be used as the point of attachment or a small section of non-conductive piping may be replaced with an equivalent section of conductive (e.g. metal) piping to which the treatment device 100 may be attached.

The treatment devices 100 described herein may be attached in a non-invasive manner that does not restrict the flow of the irrigation water.

Embodiments of the irrigation systems 200 comprising one or more treatment devices 100, as described herein, may also comprise any number of conventional components, such as one or more additive tanks, e.g. fertilizer tanks 204, for introducing additives into the irrigation water; one or more filters (e.g. gravel filters 205, screen filters 206, etc.) through which the irrigation water is conveyed prior to introduction into the main line; and the like. For the most efficient propagation of the electromagnetic signal to the water emitters (e.g. nozzles, etc.), the treatment device(s) 100 may be positioned downstream of these additional components.

In some embodiments, the irrigation system 200 may be further comprise one or more soil monitors 300, which may be configured to detect, for example, the moisture content of the soil. Given the significant increases in plant available water described herein 100, soil monitoring may allow a grower to determine the most efficient irrigation schedule, thereby reducing the volume of water pumped into a grower's field(s). In this manner, the treatment devices described herein 100 may be implemented in combination with soil monitoring to make more efficient use and conservation of water. After implementation of that schedule, continued soil monitoring may also provide a grower with important data that can be used to aid in the growing process. For instance, the results of soil moisture monitoring may be utilized to adjust an irrigation schedule in response to various events such as periods of heavy rain or drought, thereby maintaining increased efficiency in water usage.

Embodiments of the present invention are also directed to methods for treating irrigation water with a propagating electromagnetic field. For example, embodiments of the present disclosure comprise methods for generating and introducing an electromagnetic signal into an irrigation system in a manner that provides for conductive propagation of an electromagnetic field throughout the irrigation water, thereby providing the irrigation system with any of a number of beneficial effects, including for example, increases in the percentage of the irrigation water that is plant-available and crops having a greater essential mineral, e.g. calcium and/or magnesium, content.

The method comprises generating an electromagnetic signal and introducing it into a conduit of the irrigation system in a manner that provides for propagation of an electromagnetic field through the irrigation water. The signal may be introduced into the irrigation water by conduction and the propagation of the signal through the irrigation water may be facilitated by the conductivity of the irrigation water, which creates a conductive path for signal propagation (regardless of the conductivity of the conduit itself). The use of conduction and of a conductive path for propagation, as opposed to induction, provides significant benefits in terms of the ability to impact the irrigation water in a significant manner and the reproducibility of obtaining such an impact. For instance, the introduction of an electromagnetic signal into an irrigation system through induction typically results to massive losses to ground. Because only a small proportion of the signal actually makes it into the irrigation water, that signal is insufficient to produce the benefits described herein. The induction-based method is also unreliable, as an inductive system is subject to additional variables. Nevertheless, it is contemplated that in certain embodiments, a propagating electromagnetic field may be introduced into the irrigation system by induction (though unless specifically stated otherwise, all embodiments described herein should be understood to introduce the signal through conduction).

In some embodiments, the electromagnetic signal is pulsed, such as is described herein. The pulsing of the electromagnetic signal results in a pulsed, declining wave propagating through the irrigation water. It is also contemplated that in certain embodiments, a static (i.e., non-pulsed) electromagnetic signal may be used, though it is thought that use of a static signal will not produce the significant effects described herein as being achievable with a pulsed signal. Therefore, unless specifically stated otherwise, all embodiments described herein should be understood to utilize a pulsed electromagnetic signal.

Because the electromagnetic signal is introduced in a manner that provides for the propagation of an electromagnetic field through the irrigation water, the irrigation water is continuously treated with the electromagnetic signal. In other words, embodiments of the present disclosure ensure that the irrigation water is not simply charged at a single location, such as where it passes through or near a magnet or electromagnet. Rather the water is continuously charged as it flows through the irrigation system due to propagation of the electromagnetic field through the conduit. This continuous treatment provides the significant commercial benefits described herein, which cannot be achieved by conventional magnetic water treatment utilizing a single-location charge (i.e. the signal is non-propagating). Namely, because a conventional magnetic water treatment utilizes a single-location charge, it is contingent on the irrigation water having a relatively long dwell time within the treatment zone, which requires a low flowrate and multiple passes through the treatment zone (or multiple magnetic treatment zones). Yet the low flowrates and/or altered flows that would be required to place an adequate charge in the water are not commercially feasible.

By creating a propagating electromagnetic field, embodiments of the present disclosure may be used to treat any irrigation system without altering the flowrate of the irrigation water through that system. Indeed, embodiments of the present disclosure operate independently from the flowrate of the irrigation water within the irrigation system. Indeed, the flow rate of the irrigation water has no impact on the efficacy of the methods and systems described herein, since the propagating field may travel at the speed of light and pulse 40,000 times per second. Nor do the presently disclosed methods and systems require any particular flow path of the irrigation water or arrangement of the pipes used in the irrigation system. Embodiments of the presently disclosed method and system operate independently from the arrangement and cross-sectional dimension, e.g. diameter, of the piping to which they are connected.

Similarly, because the electromagnetic signal is introduced in a manner that provides for the propagation of an electromagnetic field through the irrigation water, treatment of the irrigation water occurs regardless of whether the water is flowing through the conduit or not. This is particularly important for irrigation systems, which are intermittent flow systems that are repeatedly activated such that water is flowing and deactivated such that no water is flowing. If one were to attempt to simply use a magnet or electromagnet to introduce a charge in the water as the water passes in the vicinity of the magnet/electromagnet, therefore, nothing would occur during the periods of deactivation when no water is flowing through the system. During every period of deactivation, therefore, any water that was actually charged in this manner would revert back to its natural state. Use of a propagating electromagnetic field, as described herein, provides that all of the irrigation water in the system is continuously treated, regardless of whether that water is flowing or not.

Example 1—Enhanced Wetting of Sandy Soils

A study was performed to determine whether treating irrigation water with a propagating electromagnetic field had any effect on the distribution and percolation of the water within soil.

Two drip tanks (measuring 3 feet by 3 feet by 0.5 feet and containing transparent plexiglass walls) were filled with identical sandy soil samples obtained from the same field. It is generally known that water percolates, or drains, relatively quickly through sandy soils, often leading to both poor moisture adsorption and leaching of the minerals from the soil within the root zone. The sandy soil samples in each tank were drip irrigated simultaneously over the course of five hours. The first tank was irrigated with untreated water, and served as the control. The second tank was irrigated with water that was treated with a propagating electromagnetic field in accordance with the present disclosure, and served as the test sample.

Figure 6A:
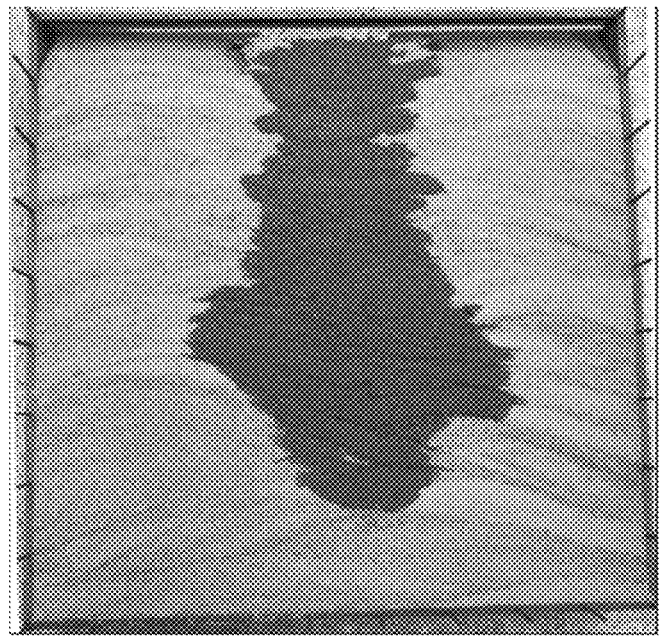
FIG. 6A is a side view of a laboratory drip tank, showing the wetting bulb of the control sample.
Figure 6B:
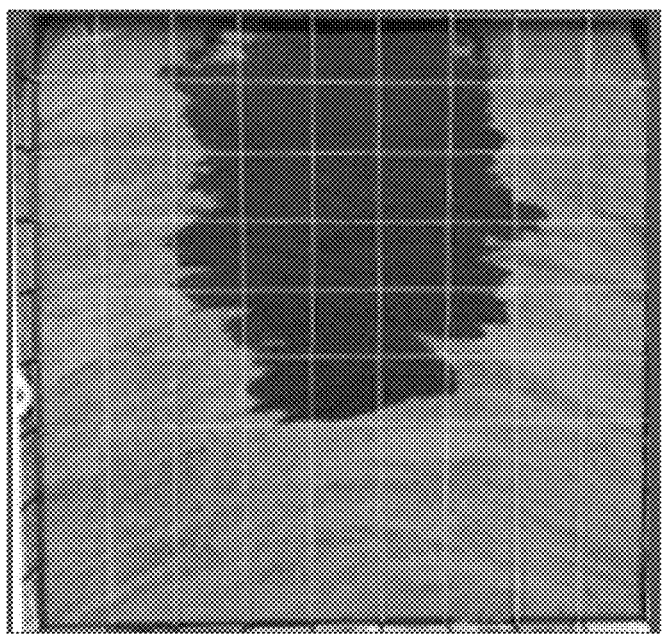
FIG. 6B is a side view of a laboratory drip tank, showing the wetting bulb of the test sample.

The moisture profiles of the soil samples were observed at the end of the five hour irrigation period. The results of the testing are shown in FIGS. 6A and 6B. Specifically, FIG. 6A shows the soil moisture profile, or wetting bulb, of the control sample and FIG. 6B shows the soil moisture profile, or wetting bulb, of the test sample.

It was observed that the untreated water percolated six inches deeper into the soil sample than the treated water. The increased percolation of the untreated water is thought to be associated with up to 50% more leaching in the soil compared to the soil that was irrigated with the treated water. Further, the treated water caused a significant increase in the lateral saturation of the soil. Specifically, within the top sixteen inches of the soil samples, the treated water covered greater than 1.33 times the surface area as the untreated water. Both the decreased (vertical) percolation and the increased lateral saturation effects achieved by the treated water can be seen through a comparison of the observed moisture profiles in FIGS. 6A and 6B.

This testing demonstrated that treatment of irrigation water with a propagating electromagnetic field in accordance with the present disclosure causes the water to both resist percolation through and improve the lateral saturation of sandy or other quick-draining soils. In combination, these two enhanced wetting effects will lead to a significant increase the volume of water that is retained within the root zone of a crop, meaning that treatment of the irrigation water in accordance with embodiments of the present disclosure may allow one to (1) obtain a desired amount of plant-available water using a reduced amount of irrigation water or (2) increase the percentage of a defined irrigation water usage that is plant-available.

The use of irrigation water that has been treated in accordance with embodiments of the present disclosure may reduce the amount of water that percolates through the root zone of a crop. As described herein, percolation of water through the root zone of a crop both (a) renders the water no longer plant-available and (b) leaches important minerals and nutrients from the soil. Thus, a reduction in the amount of water that percolates through soil may lead to both an increased amount of plant-available water (i.e. increased water usage efficiency) and a higher mineral and/or nutrient content of the soil.

For instance, in some embodiments, the use of irrigation water that has been treated in accordance with embodiments of the present disclosure may result in a reduction in percolation in a sandy or other quick-draining soil, as determined by subjecting a the soil sample to the test procedure identified in Example 1, that is at least one inch less than that obtained using untreated irrigation water, alternatively at least two inches less than that obtained using untreated irrigation water, alternatively at least three inches less than that obtained using untreated irrigation water, alternatively at least four inches less than that obtained using untreated irrigation water, alternatively at least five inches less than that obtained using untreated irrigation water, alternatively at least six inches less than that obtained using untreated irrigation water, alternatively at least seven inches less than that obtained using untreated irrigation water, alternatively at least eight inches less than that obtained using untreated irrigation water.

The use of irrigation water that has been treated in accordance with embodiments of the present disclosure may result in a lateral saturation of the top sixteen inches of soil (an important portion of the root zone for most crops) that is greater than that obtained using untreated irrigation water. For instance, in some embodiments, the use of irrigation water that has been treated in accordance with embodiments of the present disclosure may result in a lateral saturation of the top sixteen inches of a soil sample that is at least 1.1 times (10% greater than) that obtained using untreated irrigation water, alternatively at least 1.2 times (20% greater than) that obtained using untreated irrigation water, alternatively at least 1.3 times (30% greater than) that obtained using untreated irrigation water, alternatively at least 1.4 times (40% greater than) that obtained using untreated irrigation water, alternatively at least 1.5 times (50% greater than) that obtained using untreated irrigation water. The increases in lateral saturation described above may be determined, for instance, by subjecting a soil sample to the test procedure identified in Example 1.

Example 2—Enhanced Absorption in Clay Soils

A drip irrigation study was performed to test the effects of treating irrigation water with a propagating electromagnetic field on clay soil. A site in Ellensberg, Wash. that is used for the growing of Honeycrisp apples was selected. The soil at the site is classified by the official soil series descriptions (OSD) as Rollinger Ashy Silt Loam. The soil is generally considered to be a clay soil, which absorbs water slowly, often leading to pooling of the water on the surface and increased evapotranspiration. Adjacent plots were selected for the testing. The first plot, identified as block 9, was drip irrigated in four-hour sets with untreated water and served as the control plot. The second plot, identified as block 10, was drip irrigated in four-hour sets with water that was treated with a propagating electromagnetic field in accordance with the present disclosure, and served as the test plot.

The soil moisture of each plot was monitored using 24 inch six-sensor Sentek/PESSL soil probe stations, which measured and reported the volumetric water content (VWC) of the soil at six defined depths in hourly increments. The results are shown in Tables 1 and 2, below:

TABLE 1

(Control)

| | Sensor Depth | Beginning to Peak Absorption | | Absorption Time hours | VWC | | VWC |
|---|---|---|---|---|---|---|---|
| | | Begin (hrs) | End (hrs) | | Begin % | End % | Increase % |
| Root | 2" | 8 | 17 | 9 | 30.85 | 33.95 | 3.10 |
| Zone | 6" | 8 | 20 | 12 | 30.06 | 38.25 | 8.19 |
| | 10" | 8 | 20 | 12 | 39.67 | 40.28 | 0.61 |
| | 14" | 8 | 20 | 12 | 42.05 | 42.58 | 0.53 |
| | 18" | 8 | 20 | 12 | 40.98 | 41.44 | 0.46 |
| | 22" | 8 | 22 | 14 | 36.04 | 36.65 | 0.61 |

TABLE 2

(Treated Water)

| | Sensor Depth | Beginning to Peak Absorption | | Absorption Time hours | VWC | | VWC |
|---|---|---|---|---|---|---|---|
| | | Begin (hrs) | End (hrs) | | Begin % | End % | Increase % |
| Root | 2" | 8 | 12 | 4 | 29.37 | 37.65 | 8.28 |
| Zone | 6" | 8 | 12 | 4 | 38.22 | 41.60 | 3.38 |
| | 10" | 8 | 11 | 3 | 38.12 | 40.32 | 2.20 |
| | 14" | 8 | 10 | 2 | 42.83 | 45.05 | 2.22 |
| | 18" | 8 | 10 | 2 | 41.06 | 44.18 | 3.12 |
| | 22" | 8 | 10 | 2 | 37.05 | 40.43 | 3.38 |

As shown in Table 1, it took 14 hours for the untreated water to absorb down to a depth of 22 inches, within the root zone. In contrast, as shown in Table 2, it took only 2 hours for the treated water to absorb down to a depth of 22 inches, within the root zone. Thus, treatment of the water with a propagating electromagnetic field brought about an 85% reduction in the amount of time required for the water to absorb to a depth of 22 inches, within the root zone (i.e. it was 85% faster).

Treatment of the water with a propagating electromagnetic field was also observed to increase the volumetric water content (VWC) within the root zone as a whole, as measured at the end of the absorption time test. As shown in Table 1, the total VWC increase in the root zone of the control plot (after irrigation for 14 hours) was 12.89%. In contrast, the total VWC increase in the root zone of the test plot (after irrigation for 4 hours) was 19.20%. Thus, treatment of the water with a propagating electromagnetic field brought about a 49% increase in the total volumetric water content of the soil, despite having been irrigated over a significantly shorter period of time. The test results demonstrate, therefore, that the plot irrigated with the treated water held almost 50% more water (by volume) in the root zone than the plot irrigated with conventional, untreated water.

Further, because the volume of treated water held within the root zone in the sample plot was found to be significantly higher than the volume of untreated water held within the root zone in the control plot, it appears that the untreated water was subject to significantly greater losses due to evapotranspiration or surface pooling (due to failure of the untreated water to infiltrate the surface of the clay soil) and/or percolation below the root zone.

The testing demonstrated that treatment of irrigation water with a propagating electromagnetic field in accordance with the present disclosure causes the water to absorb more quickly and effectively in a clay and/or water-repellant soil. As a result, embodiments of the present disclosure may allow one to irrigate clay or other water-repellant soils less often, e.g. the time between irrigation cycles may be increased, and thus the total amount of irrigation water used in a given plot may be reduced.

The use of irrigation water that has been treated in accordance with embodiments of the present disclosure may result in an increased volumetric water content (VWC) within the root zone of a clay and/or water-repellent soil. For instance, in some embodiments the use of irrigation water that has been treated in accordance with embodiment of the present disclosure may result in an increased volumetric water content (VWC) within the top 22 inches of a clay or other water-repellant soil sample, as determined by subjecting a the soil sample to a test procedure such as that identified in Example 2, that is at least a 10% increase over that using untreated irrigation water, alternatively at least a 20% increase over that using untreated irrigation water, alternatively at least a 30% increase over that using untreated irrigation water, alternatively at least a 40% increase over that using untreated irrigation water, alternatively at least a 50% increase over that using untreated irrigation water.

The use of irrigation water that has been treated in accordance with embodiments of the present disclosure may result in an increased rate of absorption of the water into the root zone of a clay or other water-repellent soil. For instance, in some embodiments the treatment of irrigation water in accordance with embodiments of the present disclosure may result in absorption of the water into the root zone of a clay or water-repellent soil that occurs 10% percent faster than untreated water, alternatively 20% faster than untreated water, alternatively 30% faster than untreated water, alternatively 40% faster than untreated water, alternatively 50% faster than untreated water, alternatively 60% faster than untreated water, alternatively 70% faster than untreated water, alternatively 80% faster than untreated water. The increases absorption rates described above may be determined, for instance, by subjecting a soil sample to the test procedure such as that identified in Example 2, e.g. by measuring how long it takes for the water to absorb into the soil at a depth of about 22 inches under selected irrigation conditions.

Similarly, the use of irrigation water that has been treated in accordance with embodiments of the present disclosure may increase the ability of the water to infiltrate the soil, i.e. to travel below the ground surface of a field, and thus reduce the pooling of water on the surface and the evapotranspiration water losses associated therewith.

Example 3—Increased Lateral Dispersion of Water in Clay Soils

A second study was also performed at the same site in Ellensberg, Wash. that was utilized in Example 2. In this study, the lateral absorption of the water within the clay soil was measured by comparing the moisture levels of the soil at varying distances away from the irrigation system drip hole. Specifically, the moisture levels of the soil at depths up to 18 inches were measured at various distances from the drip hole. At the selected drip hole in block 9, the control plot, it was found that the soil had an adequate water content (i.e. 75% of field capacity up to 18 inches deep) no more than 24 inches away from the drip hole. At the selected drip hole in block 10, the test plot, it was found that the soil had an adequate water content (i.e. 75% of field capacity up to 18 inches deep) up to 42 inches away from the drip hole. Accordingly, the treated water was sufficiently absorbed within the root zone of soil that was 75% farther away from the drip hole than was the case using untreated water. There was also abundant plant and shrub growth within the area surrounding the drip hole in the test plot; while in the control plot, on the other hand, there was little plant or shrub growth around the drip hole.

This testing demonstrated that the lateral absorption of the water by a clay or other water-repellant soil can be significantly increased by treatment of the water in accordance with embodiments of the present disclosure. For instance, in some embodiments the treatment of irrigation water in accordance with the present disclosure may result in the (sufficient) absorption of the water into the root zone of a clay or other water-repellant soil at a maximum distance from the drip hole that is at least 10% greater than the maximum distance using untreated water, alternatively at least 20% greater than the maximum distance using untreated water, alternatively at least 30% greater than the maximum distance using untreated water, alternatively at least 40% greater than the maximum distance using untreated water, alternatively at least 50% greater than the maximum distance using untreated water, alternatively at least 60% greater than the maximum distance using untreated water, alternatively at least 70% greater than the maximum distance using untreated water, alternatively at least 75% greater than the maximum distance using untreated water.

Example 4—Increased Water Holding Within Sandy Soils

A soil water holding capacity study was performed to test the effects of treating irrigation water with a propagating electromagnetic field on the water holding within a sandy soil. A site in Boardman, Oreg. that is used for the growing of alfalfa was selected. The soil at the site is classified by the official soil series descriptions (OSD) as Quincy Fine Loamy Sand. Adjacent circular fields were selected for the testing, with each field being irrigated by an identical central pivot irrigation system. The first field, identified as field 23, was irrigated with untreated water and served as the control field. The second field, identified as field 319, was irrigated with water that was treated with a propagating electromagnetic field in accordance with the present disclosure, and served as the test field. The irrigation was performed was performed over a period of about 17 days.

Figure 7:
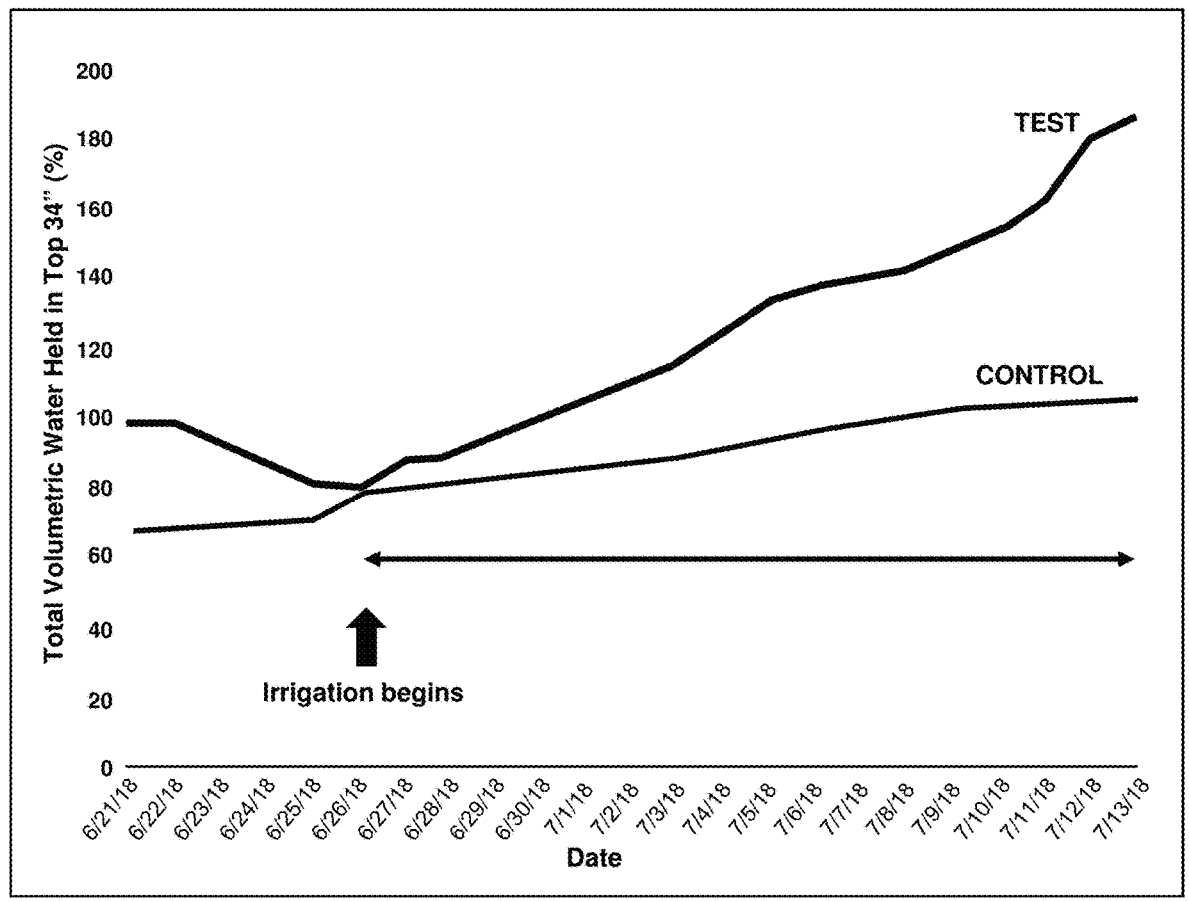
FIG. 7 is a graphical representation of the volumetric water content increases of soil within control and test fields throughout seventeen days of testing as described herein.

The soil moisture of each plot was monitored using 36 inch, nine-sensor Sentek/PESSL soil probe stations, which measured and reported the volumetric water content (VWC) of the soil at nine defined depths within the root zone (up to a depth of 36 inches) in hourly increments. The results were consolidated to produce a total VWC for the root zone (up to 36 inches depth) in each field and are shown graphically in FIG. 7 and in FIGS. 8A and 8B.

Figure 8A:
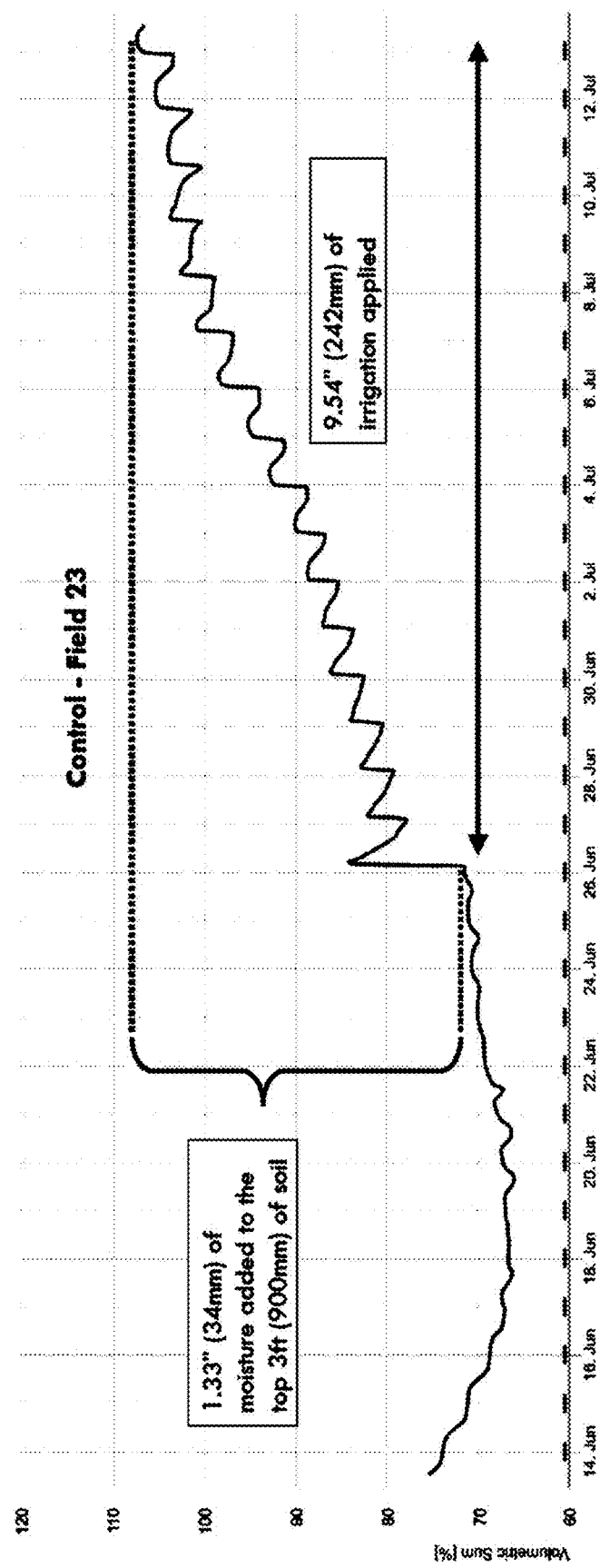
FIG. 8A is a graphical representation of the volumetric water content of soil within a control field throughout seventeen days of testing as described herein.
Figure 8B:
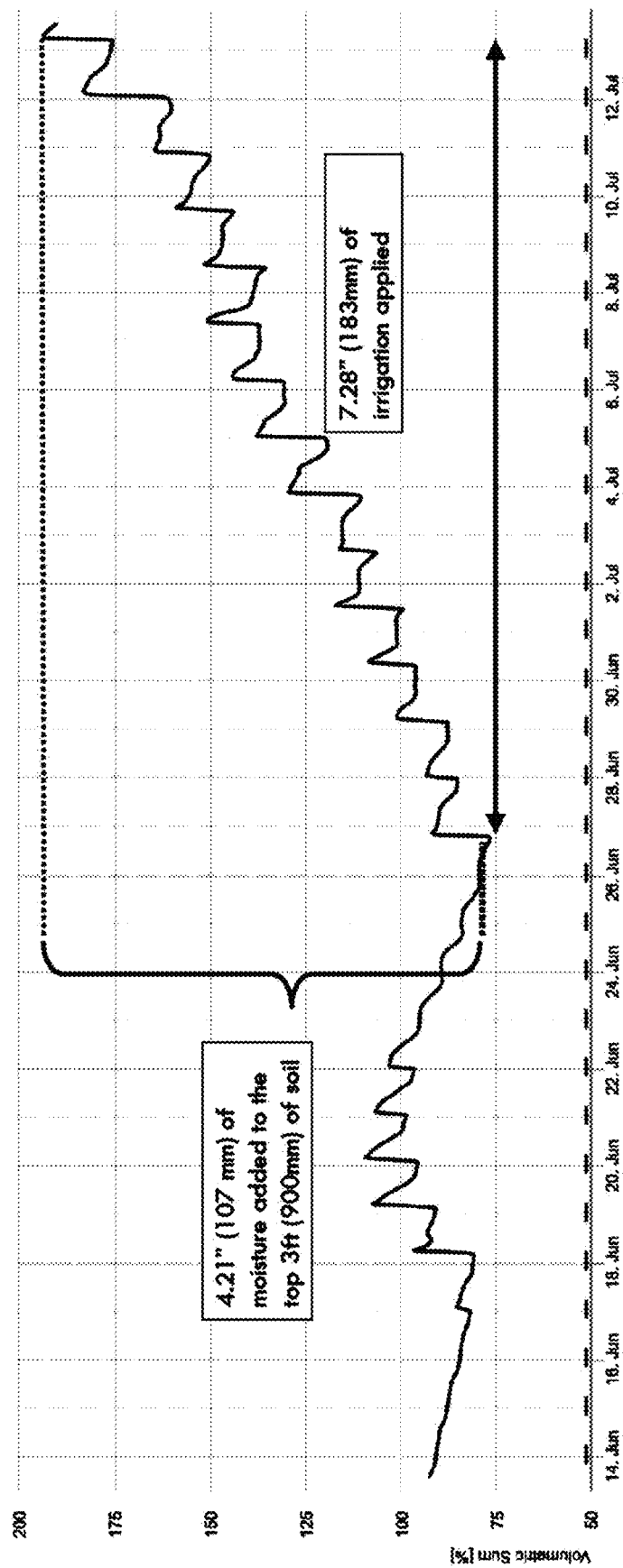
FIG. 8B is a graphical representation of the volumetric water content of soil within a test field throughout seventeen days of testing as described herein.

As shown in FIGS. 8A and 8B, the test field showed an increase in volumetric water content in the top 36 inches of soil of about 37% over that of the control field even though it used 24% less irrigation water within the test period.

Figure 9A:
FIG. 9A is a photograph showing an alfalfa crop in a control field after seventeen days of testing as described herein, using a vehicle for reference.
Figure 9B:
FIG. 9B is a photograph showing an alfalfa crop in a test field after seventeen days of testing as described herein, using a vehicle for reference.

Due to the significant increase in plant-available water (PAW), the alfalfa crop in the test field was observed to have a significantly increased yield relative to the alfalfa crop in the control field, as shown for example in the photographs provided as FIGS. 9A and 9B.

The treatment of irrigation water in accordance with embodiments of the present disclosure may result in an increased volumetric water content (VWC) within the root zone of a sandy soil. For instance, in some embodiments the use of irrigation water that has been treated in accordance with the present disclosure may result in an increased volumetric water content (VWC) within the top 36 inches of a sandy soil, such as may be determined by subjecting a the soil to a test procedure like that identified in Example 4, that is at least a 10% increase over that using untreated irrigation water, alternatively at least a 15% increase over that using untreated irrigation water, alternatively at least a 20% increase over that using untreated irrigation water, alternatively at least a 25% increase over that using untreated irrigation water, alternatively at least a 30% increase over that using untreated irrigation water, alternatively at least a 35% increase over that using untreated irrigation water, alternatively at least a 40% increase over that using untreated irrigation water.

Example 5—Increased PAW in Sandy Soils

A soil percolation study was performed to test the effects of treating irrigation water with a propagating electromagnetic field on sandy soil. A site in Mattawa, Wash. that is used for the growing of Honeycrisp apples was selected. The soil at the site is classified by the official soil series descriptions (OSD) as Burbank Fine Loamy Sand. Adjacent fields were selected for the testing. Both fields were irrigated with identical systems that each utilized under-tree sprinklers and overhead cooling. The first field was irrigated with untreated water and served as the control field. The second field was irrigated with water that was treated with a propagating electromagnetic field in accordance with the present disclosure and served as the test field.

Figure 10:
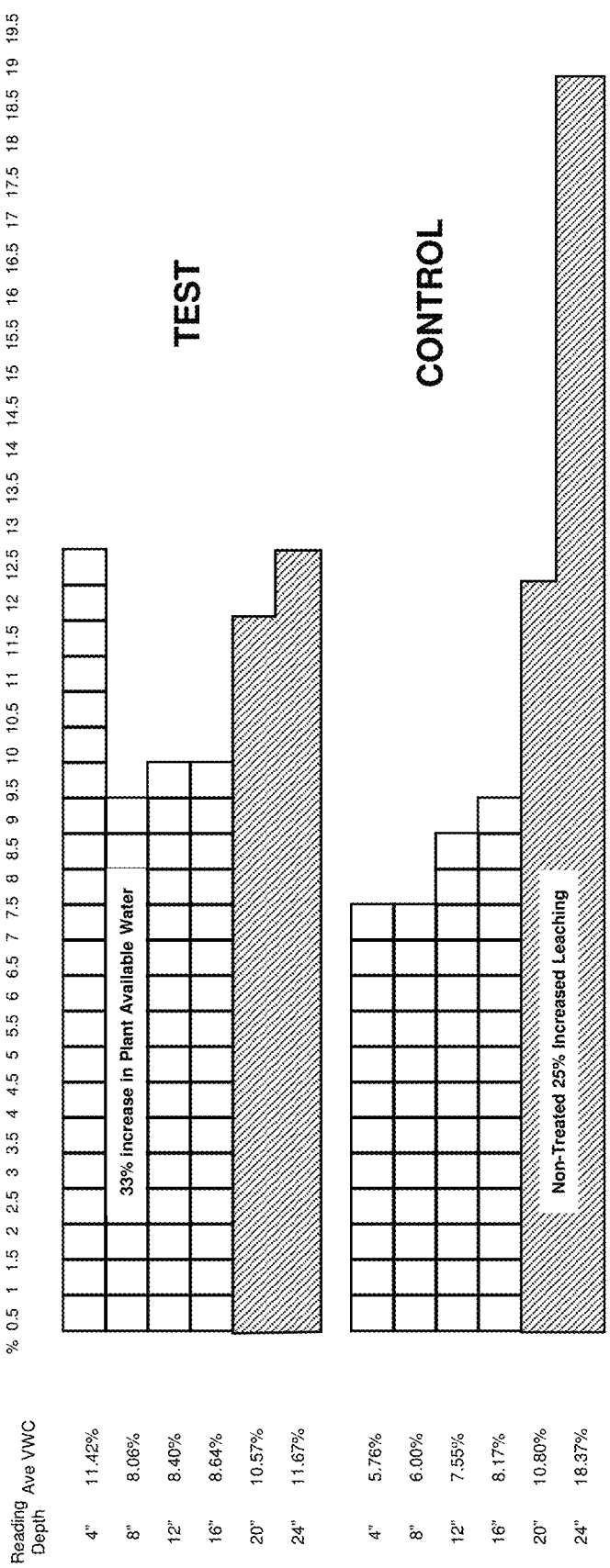
FIG. 10 is a graphical representation of the volumetric water contents of soils within a control and test field used during testing described herein.

The soil moisture of each field was monitored using 24 inch six-sensor Sentek/PESSL soil probe stations, which measured and reported the volumetric water content (VWC) of the soil at six defined depths in hourly increments. The results were tracked over a period of twelve days. The results are shown graphically in FIG. 10.

The water treated by a propagated electromagnetic field was adsorbed into the soil within an 18 inch depth to produce a 33% increase in plant available water (PAW) when compared with the 18 inch depth of the soil irrigated with untreated water. In contrast, the untreated water percolated through the top 18 inches of the soil, resulting in a 25% increase in water below the 18 inch zone over the soil irrigated with the treated water.

The treatment of irrigation water in accordance with embodiments of the present disclosure may result in an increased amount of plant available water within the top eighteen inches of soil. For instance, in some embodiments the use of irrigation water that has been treated in accordance with the present disclosure may result in an increased plant available water (PAW) within the top 18 inches of a sandy soil, such as may be determined by subjecting a the soil to a test procedure like that identified in Example 5, that is at least a 10% increase over that using untreated irrigation water, alternatively at least a 15% increase over that using untreated irrigation water, alternatively at least a 20% increase over that using untreated irrigation water, alternatively at least a 25% increase over that using untreated irrigation water, alternatively at least a 30% increase over that using untreated irrigation water, alternatively at least a 33% increase over that using untreated irrigation water.

Examples 6-9—Crops Having Increased Calcium Contents

Embodiments of the present disclosure may increase the essential mineral, e.g. calcium and/or magnesium, content of crops grown in soil that is irrigated with the treated water. Calcium is one of the most important minerals taken up by a plant from the soil in which the plant grows. In addition to being an important nutrient for humans and/or animals that consume the crops, many plants are also susceptible to diseases caused by calcium deficiency. For instance, bitter pit disorder in apples is believed to be caused by a calcium deficiency. In some instances, bitter pit disorder can cause a farmer to lose a significant percentage of his/her potential crop yield. Embodiments of the present disclosure may be effective to reduce or eliminate crop losses associated with calcium deficiencies, including for instance bitter pit disorder in apples.

A variety of calcium uptake studies were performed in order to test the effects of treating irrigation water with a propagating electromagnetic field on the calcium levels of various crops.

Example 6

A site in Naches, Wash. that is used for the growing of Honeycrisp apples was selected. The soil at the site is classified by the official soil series descriptions (OSD) as Ashue Loam Soil. Fields located in close proximity to one another were selected for the testing. Both fields were sprinkler irrigated with substantially identical systems. The first field, identified as BLK386, was irrigated with untreated water and served as the control field. The second field, identified as BLK383, was irrigated with water that was treated with a propagating electromagnetic field in accordance with the present disclosure and served as the test field. In order to test the effects of soil calcium supplementation, some portions of each field were treated with a calcium supplement, while other portions of each field were not.

Figure 11A:
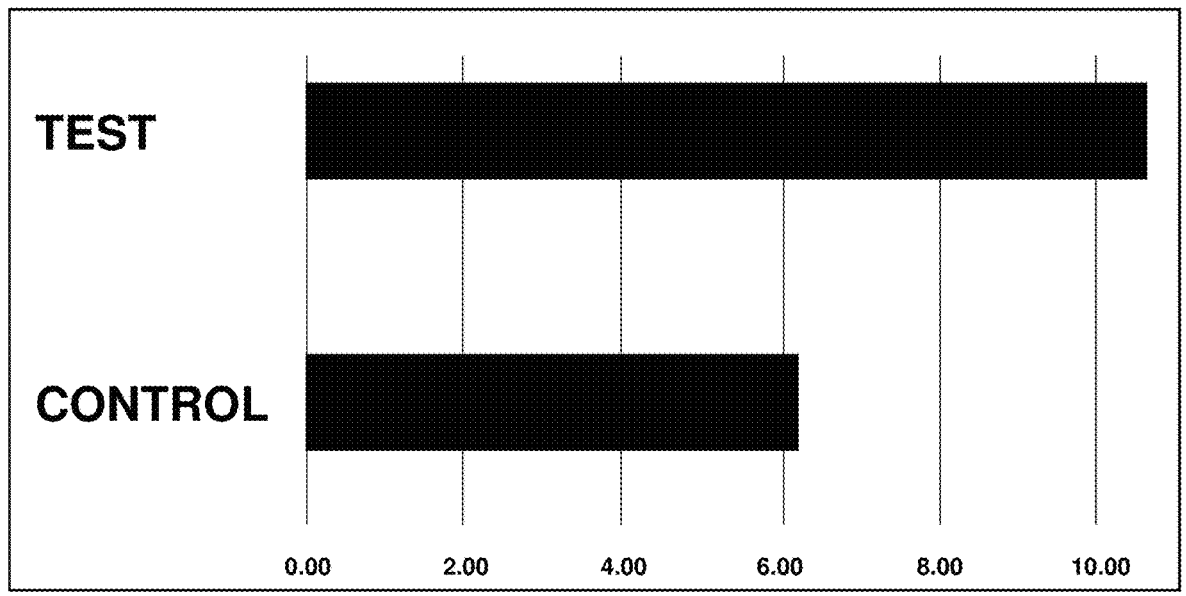
FIG. 11A is a graphical representation of the results of calcium content testing of apples taken from both a test field and a control field.
Figure 11B:
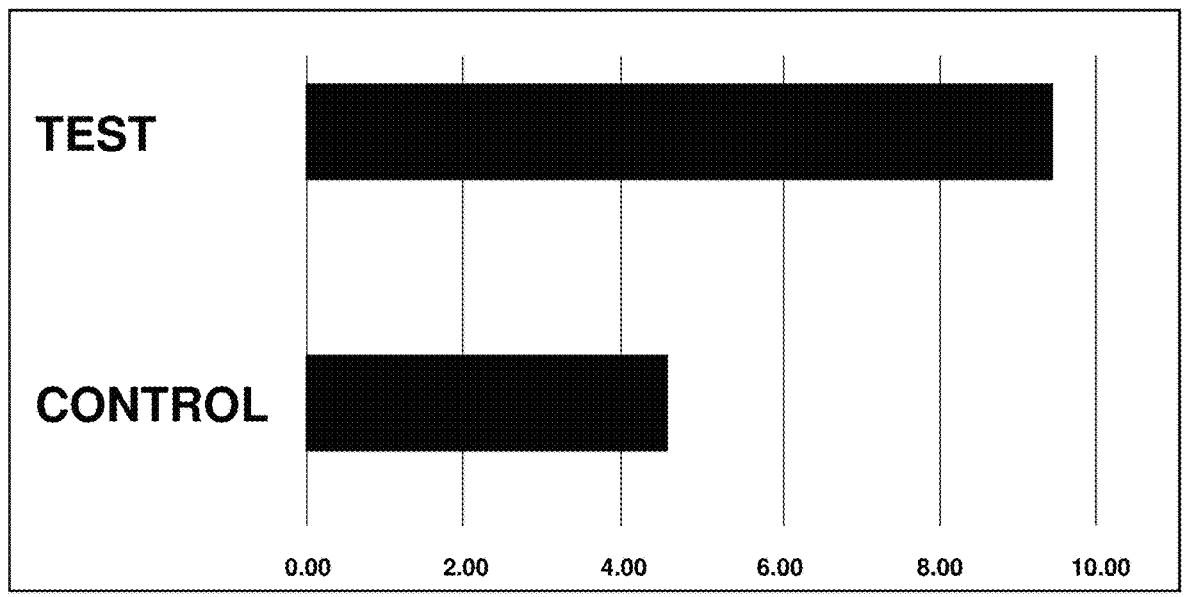
FIG. 11B is a graphical representation of the results of calcium content testing of apples taken from both a test field and a control field.

Ten apples from different areas of each field were sent to the A&L Western Laboratories in Modesto, Calif. for a blind testing of the calcium content of the fresh fruit. The results are shown in FIGS. 11A and 11B (with the scale being in mg Ca/100 g fruit). As shown in FIG. 11A, for apples harvested from the portions of the control and test fields that were not supplemented with calcium, the apples from the test field were found to have a 71% increase in calcium content. As shown in FIG. 11B, for apples harvested from the portions of the control and test fields that were supplemented with calcium, the apples from the test field were found to have a 100% increase in calcium content.

Figure 12A:
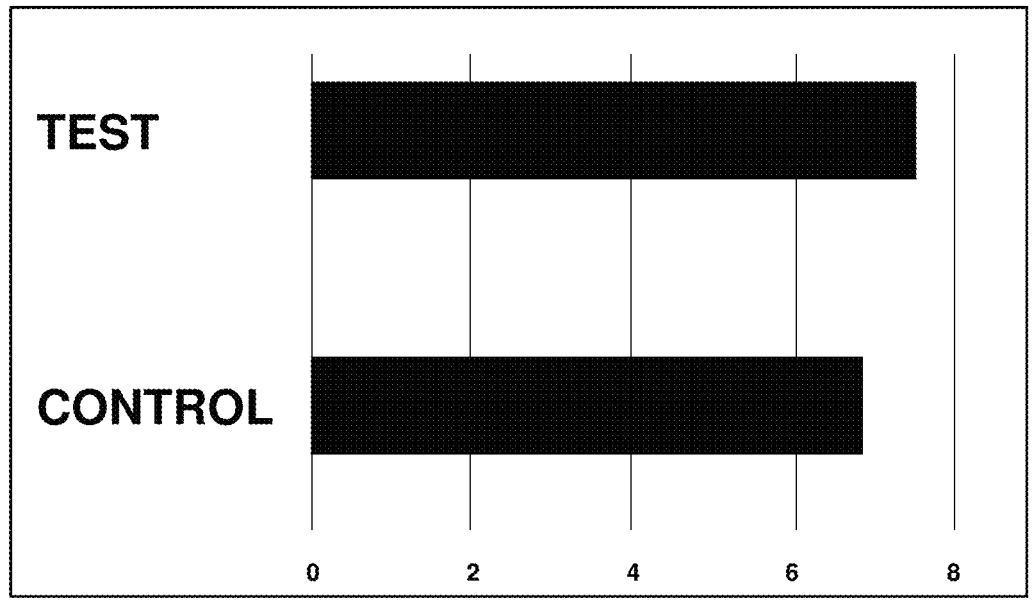
FIG. 12A is a graphical representation of the results of calcium content testing of apples taken from both a test field and a control field.
Figure 12B:
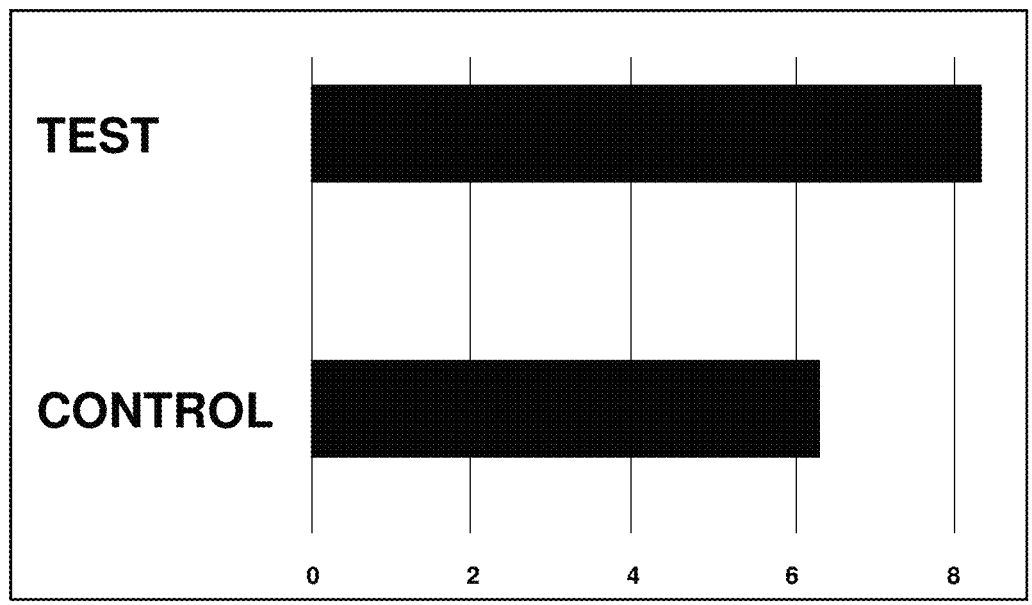
FIG. 12B is a graphical representation of the results of calcium content testing of apples taken from both a test field and a control field.

Similarly, ten apples from different areas of each field were also sent to the SoilTech Laboratories in Walla Walla, Wash. for a blind testing of the calcium content of the fresh fruit. The results are shown in FIGS. 12A and 12B (with the scale being in Ca %). As shown in FIG. 12A, for apples harvested from the portions of the control and test fields that were not supplemented with calcium, the apples from the test field were found to have a 9% increase in calcium content. As shown in FIG. 12B, for apples harvested from the portions of the control and test fields that were supplemented with calcium, the apples from the test field were found to have a 33% increase in calcium content.

Example 7

A site in Ellensburg, Wash. that is used for the growing of Honeycrisp apples was selected. The soil at the site is classified by the official soil series descriptions (OSD) as Ashy Silt Loam Soil. Fields located in close proximity to one another were selected for the testing. Both fields were drip irrigated with substantially identical systems. The first field, identified as BLK17, was irrigated with untreated water and served as the control field. The second field, identified as BLK11, was irrigated with water that was treated with a propagating electromagnetic field in accordance with the present disclosure and served as the test field. Neither field was provided with calcium supplementation.

Figure 13:
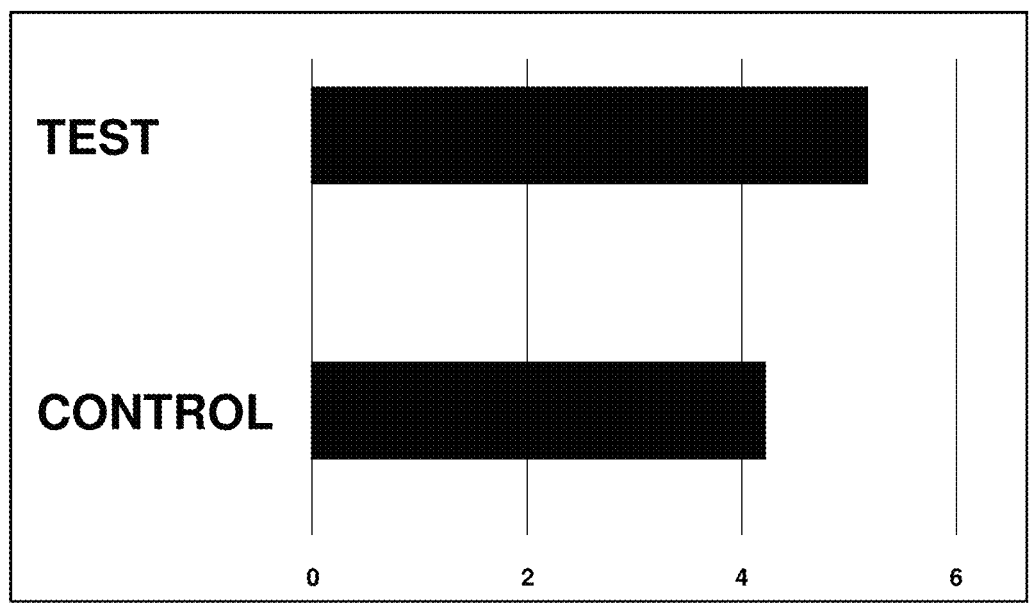
FIG. 13 is a graphical representation of the results of calcium content testing of apples taken from both a test field and a control field.

Ten apples harvested from different areas of each field were sent to the A&L Western Laboratories in Modesto, Calif. for a blind testing of the calcium content of the fresh fruit. The results are shown in FIG. 13 (with the scale being in mg Ca/100 g fruit). As shown in FIG. 13, the results of the fresh fruit analysis showed that the apples from the test field had a 24% increase in calcium content over the apples from the control field.

The calcium content data from Examples 6 and 7 were combined and averaged, with the results showing a 28% increase in calcium levels of apples grown in soil that was irrigated with water treated in accordance with an embodiment of the present disclosure (having a p-value of 94.55%).

In some embodiments, irrigation water may be treated with an embodiment of the present disclosure so as to bring about an increase in the calcium content of apples of at least 5%, alternatively an increase of at least 10%, alternatively an increase of at least 15%, alternatively an increase of at least 20%, alternatively an increase of least 25%.

Example 8

A site in Quincy, Wash. that is used for the growing of chip potatoes was selected. The soil at the site is classified by the official soil series descriptions (OSD) as Fine Sand Soil. Fields located in close proximity to one another were selected for the testing. Both fields were center pivot irrigated with substantially identical systems. The first field, identified as B10 East, was irrigated with untreated water and served as the control field. The second field, identified as B10 West, was irrigated with water that was treated with a propagating electromagnetic field in accordance with the present disclosure and served as the test field. In order to test the effects of soil calcium supplementation, some portions of each field were treated with a calcium supplement, while other portions of each field were not.

Figure 14A:
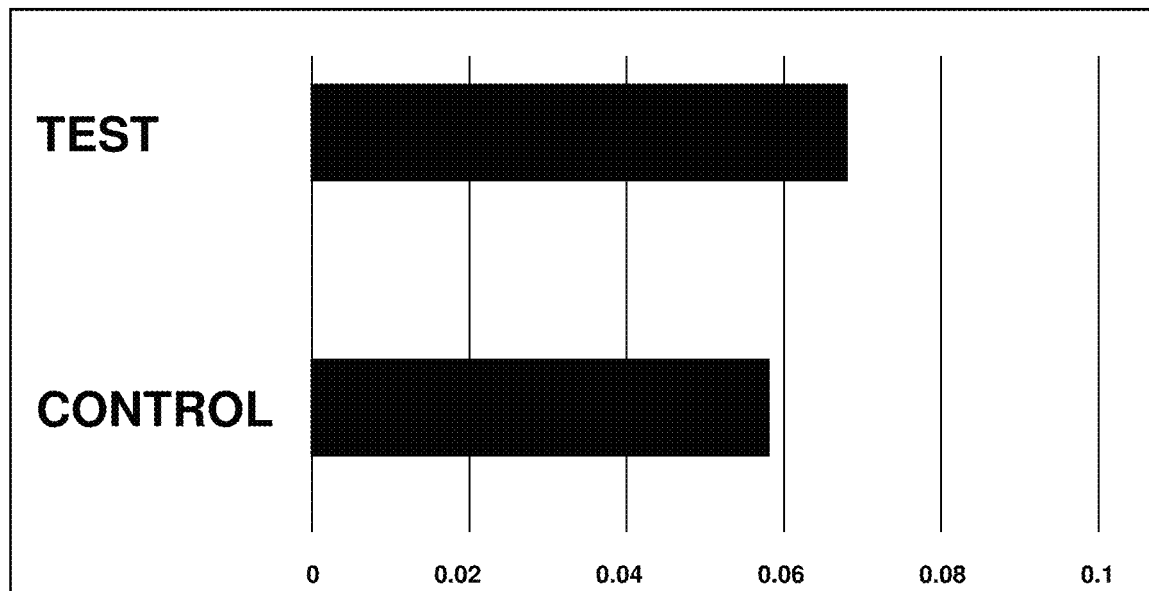
FIG. 14A is a graphical representation of the results of calcium content testing of potatoes taken from both a test field and a control field.
Figure 14B:
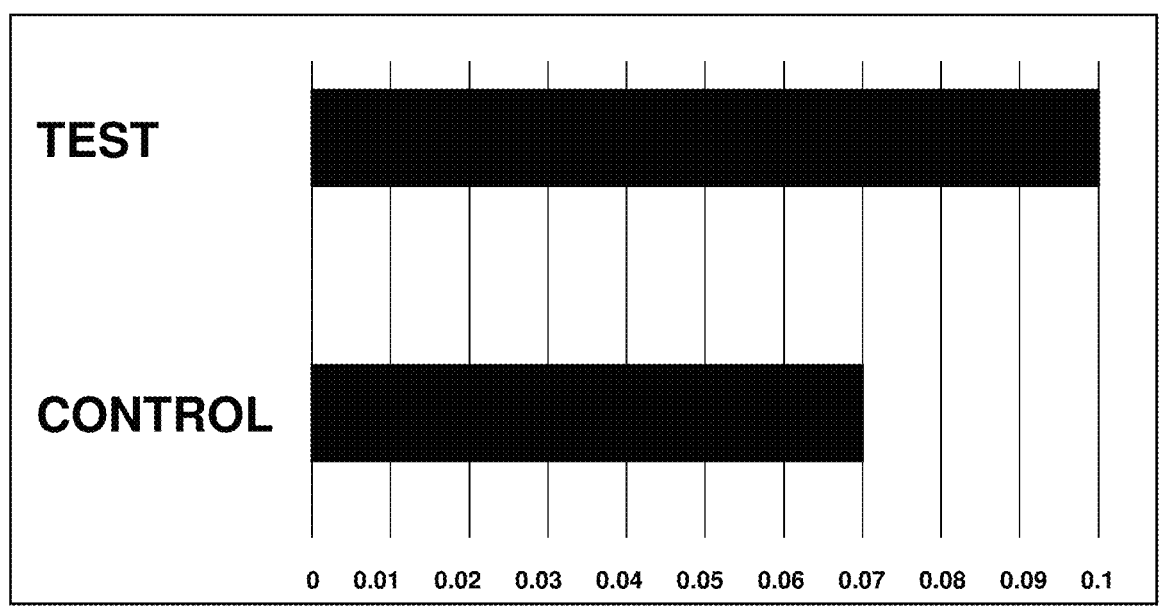
FIG. 14B is a graphical representation of the results of calcium content testing of potatoes taken from both a test field and a control field.

Potatoes from samples sites within each field were sent to the Soil Test Labs in Moses Lake, Wash. for blind testing of the dry tuber calcium content. The results are shown in FIGS. 14A and 14B (with the scale being in Ca % of the dried tubers). As shown in FIG. 14A, for potatoes harvested from sixteen sample sites within the portions of the control and test fields that were not supplemented with calcium, the potatoes from the test field were found to have a 15% increase in calcium content over those from the control field. As shown in FIG. 14B, for potatoes harvested from six randomly selected sample sites within the portions of the control and test fields that were supplemented with calcium, the potatoes from the test field were found to have a 38% increase in calcium content over those from the control field.

In some embodiments, irrigation water may be treated with an embodiment of the present disclosure so as to bring about an increase in the calcium content of potatoes of at least 5%, alternatively an increase of at least 10%, alternatively an increase of at least 15%, alternatively an increase of at least 20%, alternatively an increase of least 25%.

Example 9

A site in Boardman, Oreg. that is used for the growing of alfalfa was selected. The soil at the site is classified by the official soil series descriptions (OSD) as Loamy Fine Sand Soil. Fields located in close proximity to one another were selected for the testing. Both fields were center pivot irrigated with substantially identical systems. The first field, identified as Circle 23, was irrigated with untreated water and served as the control field. The second field, identified as Circle 19, was irrigated with water that was treated with a propagating electromagnetic field in accordance with the present disclosure and served as the test field. Neither field was provided with calcium supplementation.

Figure 15:
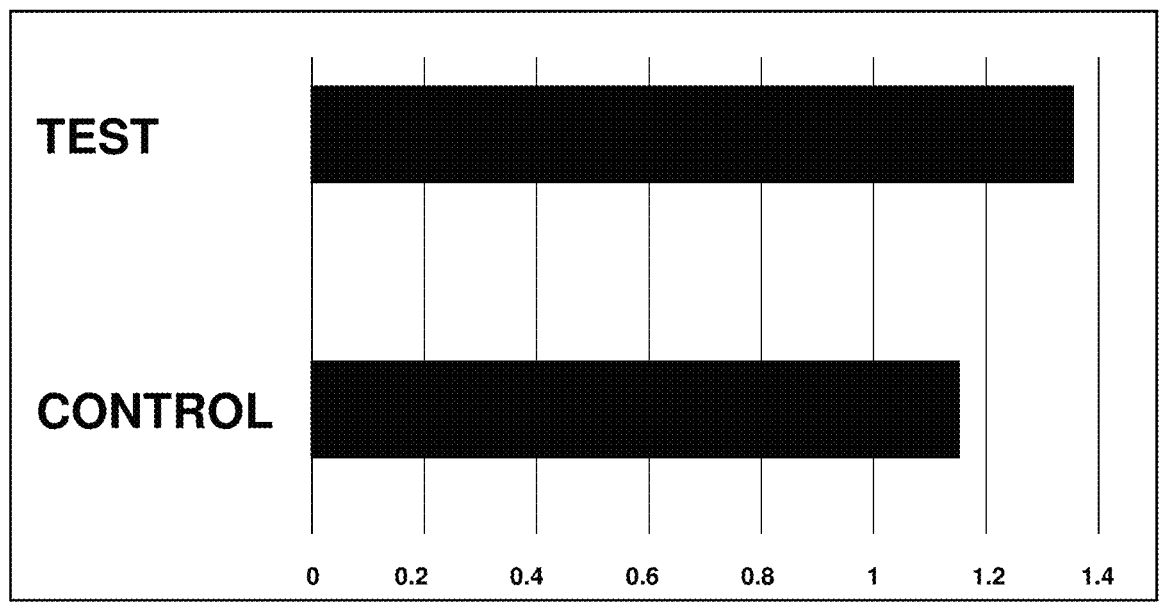
FIG. 15 is a graphical representation of the results of calcium content testing of alfalfa taken from both a test field and a control field.

Alfalfa harvested from each field were sent to the Soil Test Labs in Moses Lake, Wash. for a blind testing of the calcium content of the dried alfalfa plant tissue. The results are shown in FIG. 15 (with the scale being in Ca %). As shown in FIG. 15, the results showed that the dried plant tissue of the alfalfa from the test field had a 17% increase in calcium content over the dried plant tissue of the alfalfa from the control field.

In some embodiments, irrigation water may be treated with an embodiment of the present disclosure so as to bring about an increase in the calcium content of alfalfa of at least 5%, alternatively an increase of at least 10%, alternatively an increase of at least 15%, alternatively an increase of at least 20%, alternatively an increase of least 25%.

The above testing demonstrates that consistent increases in crop calcium content are achievable by using irrigation water treated by embodiments of the present disclosure, regardless of crop type, soil type, irrigation system, and the like.

In some embodiments, irrigation water may be treated with an embodiment of the present disclosure so as to bring about at least a 5% increase in the calcium content of a crop, alternatively at least a 10% increase in the calcium content of a crop, alternatively at least a 15% increase in the calcium content of a crop, alternatively at least a 20% increase in the calcium content of a crop, alternatively at least a 25% increase in the calcium content of a crop.

It can be seen that the described embodiments provide unique and novel methods and systems that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of increasing water content of soil within a root zone of a crop without increasing a flow of irrigation water through an irrigation system comprising an arrangement of conduits, the method comprising:
    treating the irrigation water by introducing an electromagnetic signal into the water in a manner that produces propagation of an electromagnetic field throughout the water within the arrangement of conduits, and
    irrigating a field containing soil and a crop with the treated irrigation water,
    thereby increasing the water content of the soil within a root zone of the crop compared to that of the field irrigated in the same manner but with untreated irrigation water,
    wherein the treatment causes a reduction in the surface tension of the water.

2. The method of any one claim 1, wherein the electromagnetic signal is conductively introduced into the irrigation water.

3. The method of claim 2, wherein the electromagnetic signal is conductively introduced into the irrigation water by any of the following:
    (a) a connection between a terminal of an electrical circuit and a conduit containing the irrigation water, wherein the conduit is made of conductive material;
    (b) a connection between a terminal of an electrical circuit and a conductive material inserted to a section of a conduit containing the irrigation water; or (c) a connection between a terminal of an electrical circuit and a conductive material clamped around a section of a conduit containing the irrigation water.

4. The method of claim 1, wherein the electromagnetic signal is pulsed.

5. The method of claim 4, wherein each pulse of the electromagnetic signal has a frequency between 5 kHz and 20 kHz.

6. The method of claim 1, wherein the electromagnetic signal has a frequency between 50 kHz and 400 kHz.

7. The method of claim 1, wherein the introducing an electromagnetic signal comprises:
generating a radio frequency signal, and
injecting the signal into the irrigation water through an operative connection between the first terminal of an electrical circuit and a conduit of an irrigation system containing the irrigation water,
wherein a second terminal of the electrical circuit is operably connected to ground to balance a load presented by the irrigation system.

8. The method of claim 7, wherein the electrical circuit comprises a transformer having a primary coil and secondary coil, wherein the first terminal is a first terminal of the secondary coil and wherein the second terminal is a second terminal of the secondary coil.

9. The method of claim 7, wherein the radio frequency signal is generated by a microcontroller.

10. The method of claim 7, further comprising amplifying the radio frequency signal before it is injected into the irrigation water.

11. The method of claim 1, further comprising reducing the amount of water used to irrigate the field by at least 5% compared to the use of untreated irrigation water.

12. The method of claim 11, further comprising reducing the amount of water used to irrigate the field by at least 10% compared to the use of untreated irrigation water.

13. The method of claim 12, further comprising reducing the amount of water used to irrigate the field by at least 20% compared to the use of untreated irrigation water.

14. The method of claim 1, wherein
i. the soil is a clay soil and treatment of the irrigation water causes the water to have an increased amount and/or rate of absorption into the soil,
ii. the soil is a sandy soil and treatment of the irrigation water causes the water to have a decreased amount and/or rate of percolation through the root zone, or
iii. the soil is a water-repellant soil and treatment of the irrigation water causes the water to have an increased rate of infiltration of the soil.

15. The method of claim 1, wherein the treatment also increases a calcium content of the crop compared to that from the field irrigated in the same manner but with untreated irrigation water.

16. The method of claim 15, wherein the calcium content of the crop is increased by at least 5% relative to that from the field irrigated in the same manner but with untreated irrigation water.

17. The method of claim 1, wherein the amount of chemical surfactant, fertilizer, or both that is introduced into the irrigation water is reduced compared to that introduced into the untreated irrigation water.

18. The method of claim 1, wherein irrigating the field is performed by drip irrigation, sprinkler irrigation, center pivot irrigation, lateral move irrigation, or a combination thereof.

19. The method of claim 1, wherein the treatment does not include altering a flowrate or flow path of the irrigation water through an irrigation system.

20. The method of claim 1, further comprising continuously treating the irrigation water regardless of whether the water is flowing.

21. A method of using a system that introduces an electromagnetic signal into water in a manner that produces propagation of an electromagnetic field through the water to increase the water content of soil within a root zone of a crop, the method comprising:
treating irrigation water to reduce the surface tension of the water by introducing an electromagnetic signal into the water in a manner that produces propagation of an electromagnetic field through the water, and
irrigating a field containing soil and a crop with the treated irrigation water,
thereby increasing the water content of the soil within a root zone of the crop compared to that of the field irrigated in the same manner but with untreated irrigation water.

22. The method of claim 21, further comprising reducing the amount of water used to irrigate the field based on the increase in the water content of the soil within a root zone of the crop achieved by the treatment.

23. A method of increasing water content of soil within a root zone of a crop without increasing a flow of irrigation water through an irrigation system comprising an arrangement of conduits, the method comprising:
treating the irrigation water by introducing an electromagnetic signal into the water in a manner that produces propagation of an electromagnetic field throughout the water within the arrangement of conduits, and
irrigating a field containing soil and a crop with the treated irrigation water,
thereby increasing the water content of the soil within a root zone of the crop compared to that of the field irrigated in the same manner but with untreated irrigation water, wherein:
i. the soil is a clay soil and treatment of the irrigation water causes the water to have an increased amount and/or rate of absorption into the soil,
ii. the soil is a sandy soil and treatment of the irrigation water causes the water to have a decreased amount and/or rate of percolation through the root zone, or
iii. wherein the soil is a water-repellant soil and treatment of the irrigation water causes the water to have an increased rate of infiltration of the soil.

24. The method of claim 23, wherein the introducing an electromagnetic signal comprises:
generating a radio frequency signal, and
injecting the signal into the irrigation water through an operative connection between the first terminal of an electrical circuit and a conduit of an irrigation system containing the irrigation water,
wherein a second terminal of the electrical circuit is operably connected to ground to balance a load presented by the irrigation system.

* * * * *